June 30, 1931. M. SKLOVSKY 1,812,121
METHOD OF AND APPARATUS FOR MAKING CASTINGS AND HANDLING
AND CONDITIONING THE MOLDING SAND THEREFOR
Filed Aug. 2, 1926 7 Sheets-Sheet 1

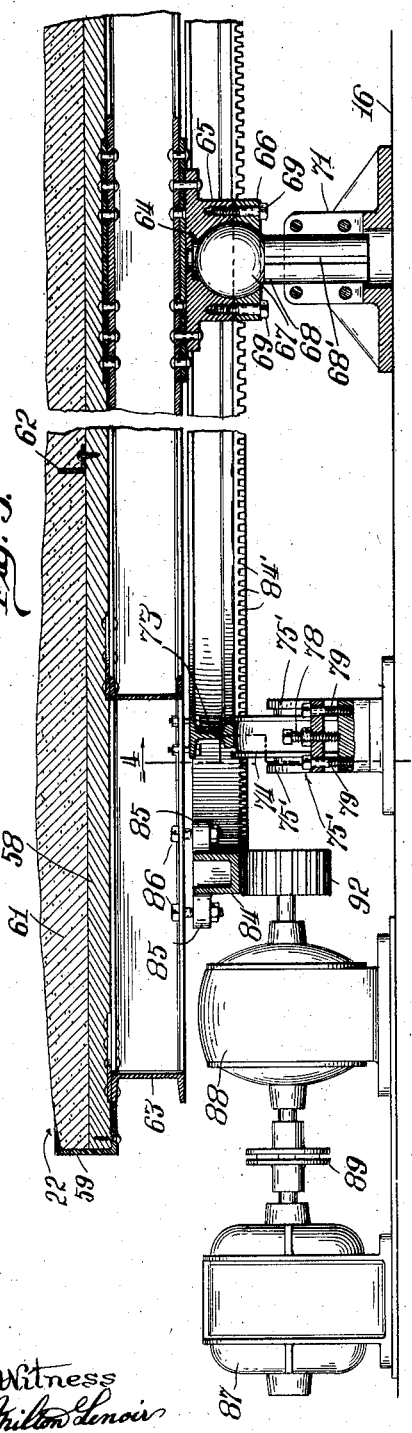
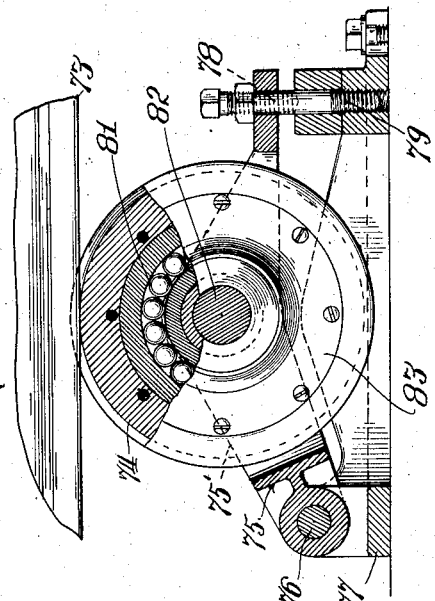
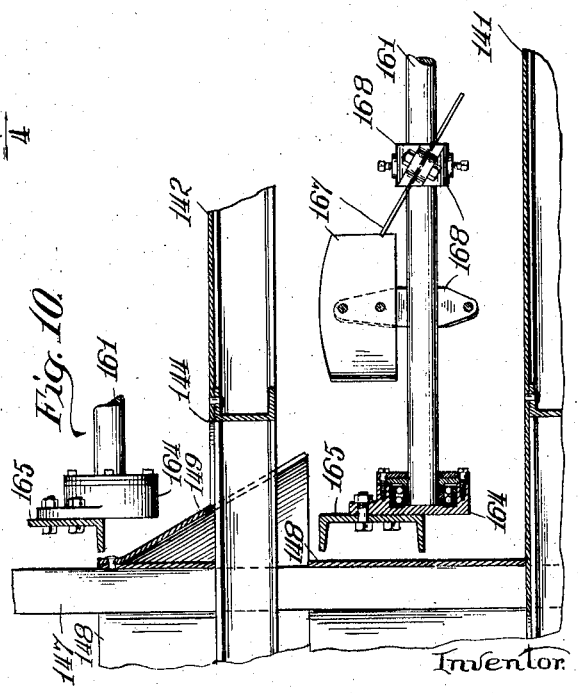

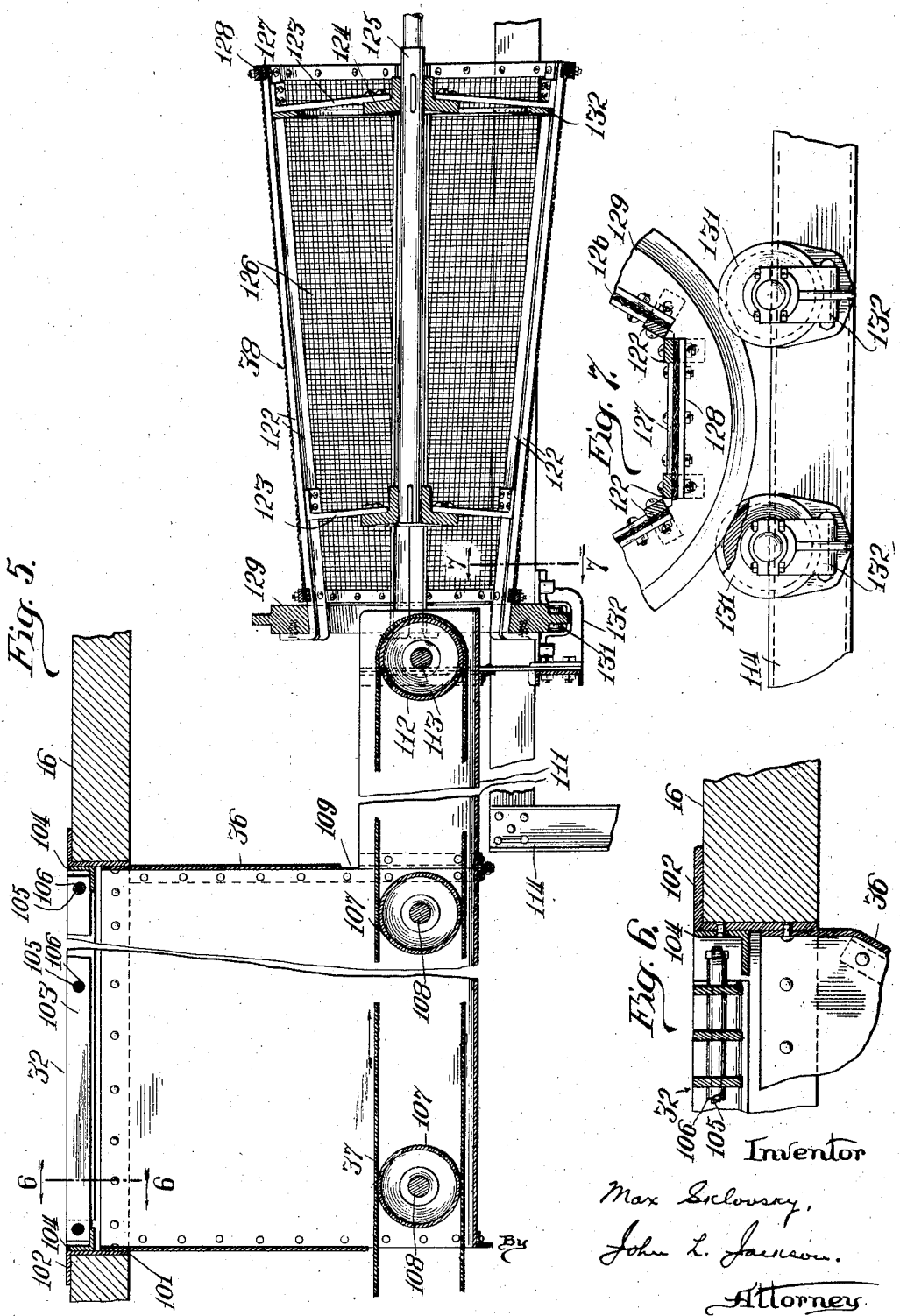

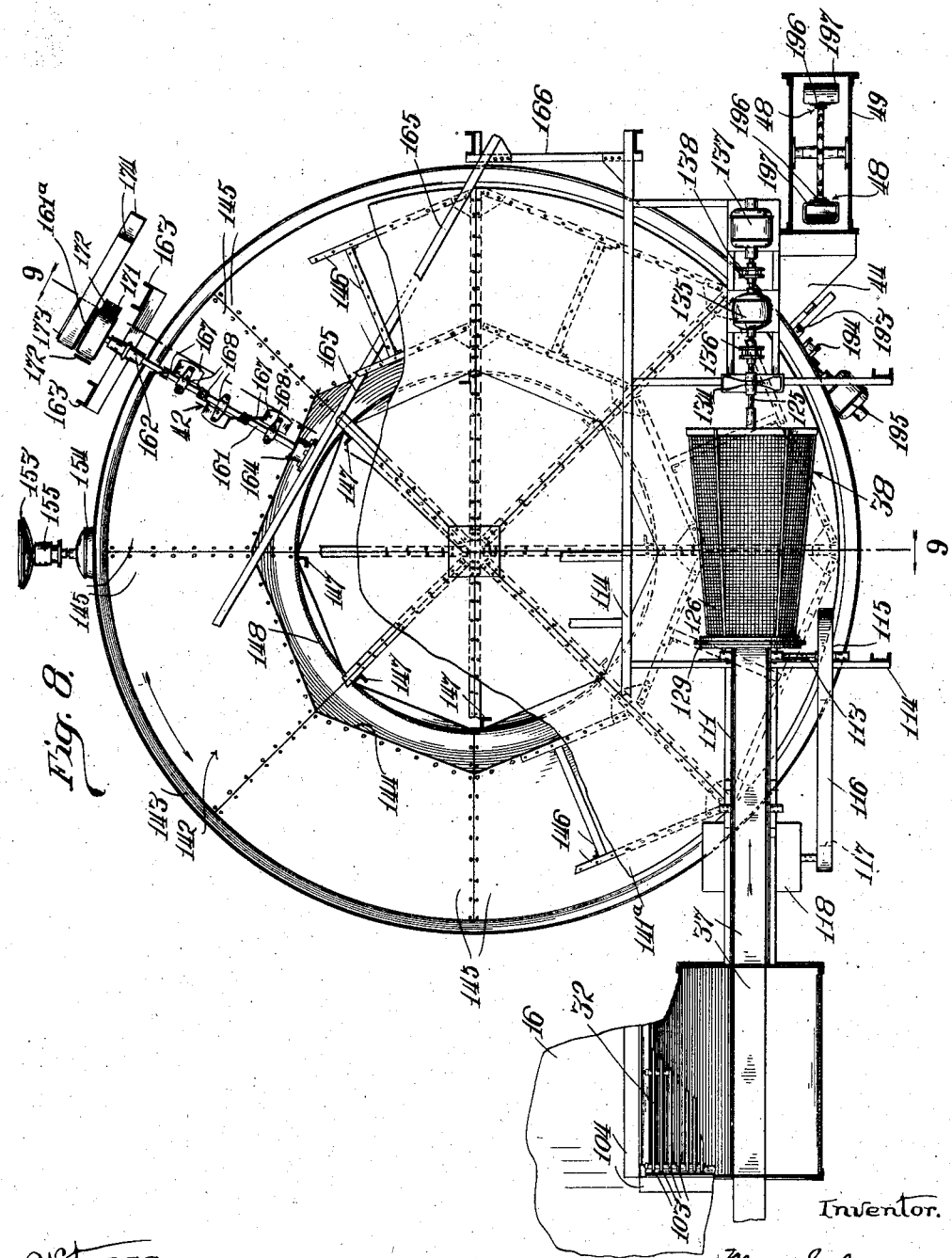

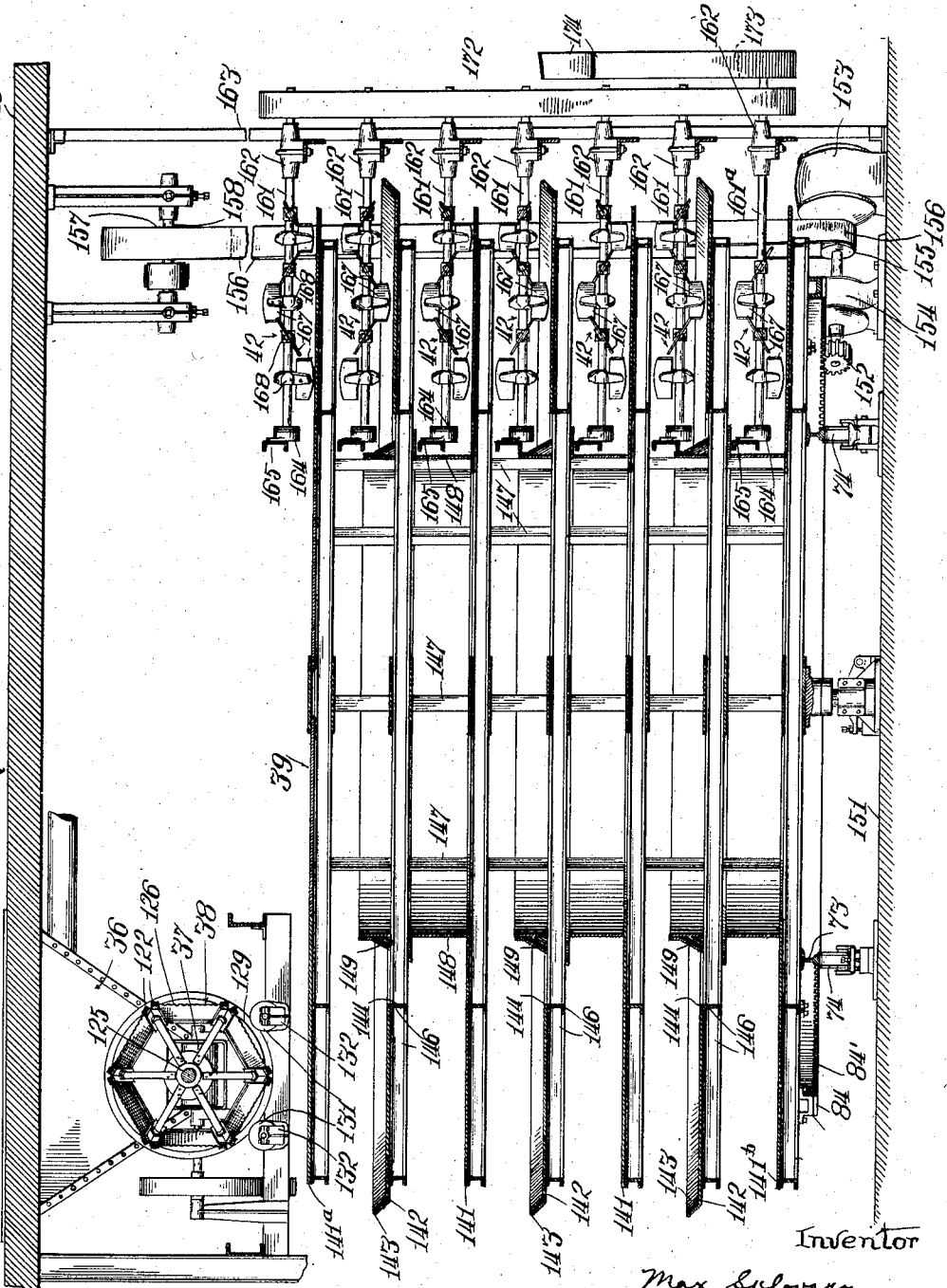

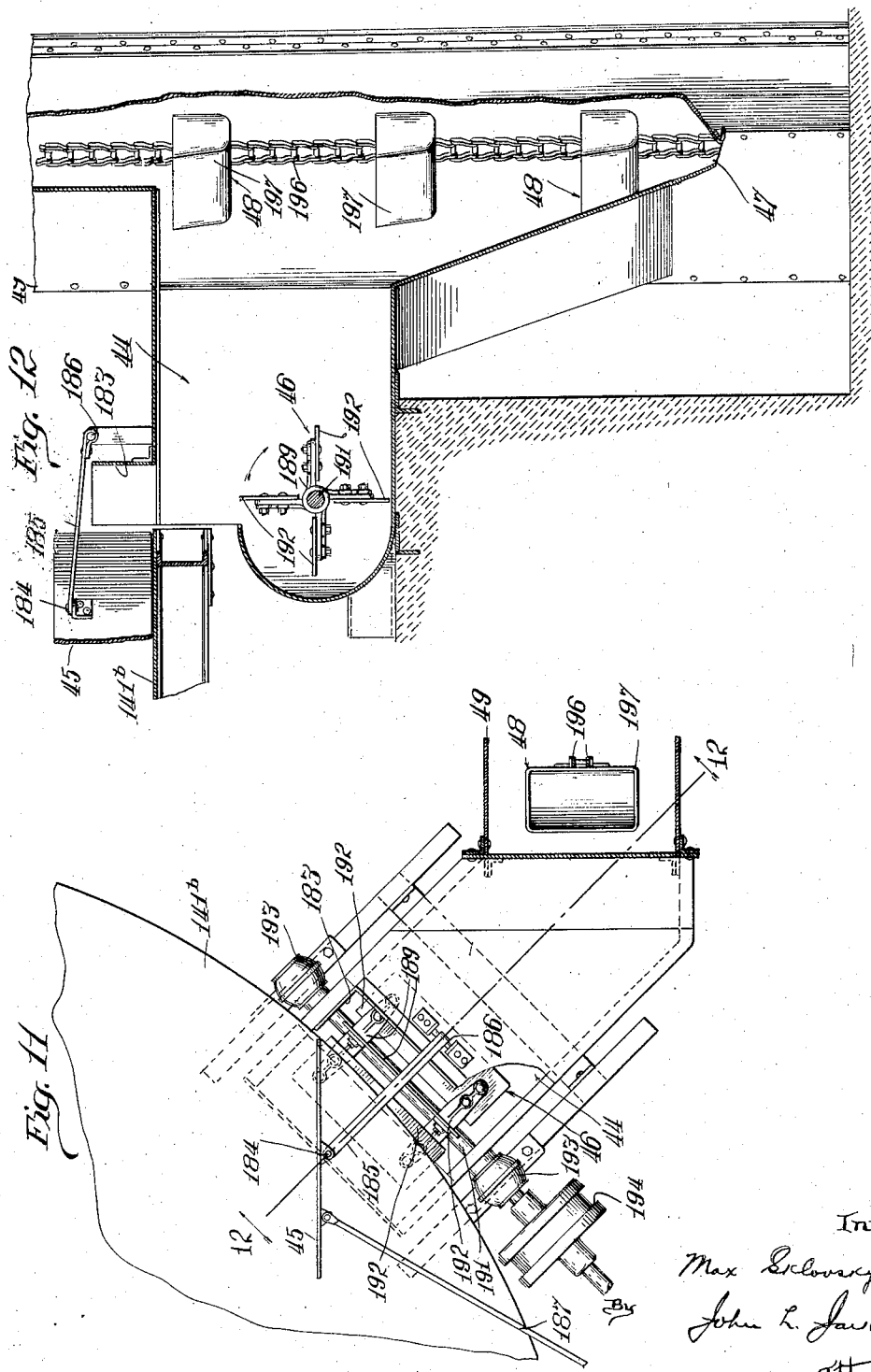

Patented June 30, 1931

1,812,121

UNITED STATES PATENT OFFICE

MAX SKLOVSKY, OF MOLINE, ILLINOIS, ASSIGNOR TO DEERE & COMPANY, OF MOLINE, ILLINOIS, A CORPORATION OF ILLINOIS

METHOD OF AND APPARATUS FOR MAKING CASTINGS AND HANDLING AND CONDITIONING THE MOLDING SAND THEREFOR

Application filed August 2, 1926. Serial No. 126,492.

The present invention relates to methods of and apparatus for making castings, and handling and conditioning the molding sand therefor.

The invention aims broadly to provide an improved method of and apparatus for making castings by a continuous casting process, and also aims to provide an improved method of and apparatus for handling and conditioning the sand used in this casting process.

The continuous casting cycle involves: first, forming the molds at a mold setting or forming zone; transferring the molds to a revolving pouring table in close proximity thereto, on which table the molds are maintained in continuous movement during the pouring of the metal therein and during the cooling of the metal in the molds; returning the molds by the movement of the table to a dumping zone preferably in close proximity to the mold forming zone; lifting the molds from the table at this dumping point and opening and dumping the flasks thereof; and finally returning the empty flasks to the mold forming zone for the making of new molds for a repetition of this same cycle.

Numerous advantages follow from the rapidity with which this cycle can be completed. Generally the time interval will depend upon the time required for the completion of the longest step in the cycle, which will vary considerably with the different sizes and shapes of the articles to be cast. As illustrative of the results attained in one installation which I have built for the casting of wheels for mowing machines, etc., the entire cycle, from the time that the molds are filled with sand to the time when the empty flasks are returned to this mold forming zone, is completed in approximately twenty minutes.

Several advantages are obtained by this continuous method of casting. The investment in mold flasks is much smaller as only a few flasks are required; for example, in the installation referred to above, approximately fifteen or twenty complete molds suffice for the making of several hundred mower wheels per day. The space requirements for carrying on this method of making castings are much less than are necessary for the previous practice wherein molds for the entire day's output are first formed in preparation for the one pouring operation of the day. Furthermore, there is less time lost by the individual workman waiting for particular duties, inasmuch as each step or duty is being continually repeated in this continuous casting process. Finally, the gross output in tons of castings, computed upon the basis of space and labor is much higher with this continuous casting process.

One factor which has made this continuous casting process feasible is the method of handling and properly conditioning the molding sand. The present method of handling and conditioning the sand involves a continuous cycle, similar to the casting process, operating upon the theory of utilizing a relatively small volume of sand and circulating it continuously through a closed cycle wherein occur certain conditioning and handling steps which quickly prepare the sand for each subsequent use. By virtue of certain improvements in the steps and in the apparatus which I employ in this sand conditioning cycle, the sand can be reconditioned in a comparatively short time. As illustrative of the rapidity of this operation I again refer to the installation mentioned above wherein the sand makes a complete circuit through the conditioning portion of its cycle in about the same length of time required for the completion of one casting operation viz. approximately twenty minutes. The present process avoids the long time interval and other objections inherent in prior methods of conditioning sand. For example, where the sand is conditioned in large quantities, such as on the molding floor or in overhead bins, it generally requires such a long time interval that the prevailing practice is to allow the sand to become reconditioned over night or at the best in several hours. This generally means that the sand can only be used once or twice each day, and hence requires that a relatively large volume of this conditioned sand be available for the entire day's casting operations. The space occupied by such sand, either on the molding floor or in overhead bins is a decided objection. Moreover, when the sand is reconditioned and allowed to remain in mass quantities in this manner there is a tendency for the sand to pack and lose its desired looseness. Where the sand is contained in bins or hoppers this tendency to pack often results in the sand bridging over in the chutes or other conveying means, involving delay and irregularity of delivery to the molds.

According to the present method of conditioning the sand, all the sand in the system is conveyed through the conditioning cycle in a relatively thin stratum or stream and is subjected to uniform treatment so that uniformity of condition of the sand is obtained and in a comparatively short time.

Referring now to the accompanying drawings wherein I have illustrated an embodiment constructed and operated substantially in accordance with the installation previously referred to:

Fig. 3 is a fragmentary sectional view through a portion of the pouring table for illustrating the details thereof.

Fig. 4 is a view partly in elevation and partly in section, illustrating one of the rollers for supporting the pouring table.

Fig. 5 is a fragmentary vertical sectional view through the dumping hopper, the conveying belt and the rotating screen of the sand conditioning apparatus.

Fig. 6 is a detail sectional view taken on the plane of the line 6—6 of Fig. 5.

Fig. 7 is a similar sectional view taken on the plane of the line 7—7 of Fig. 5.

Fig. 8 is a plan view of the dumping hopper, rotating screen and sand conditioning unit, a portion of the top tray of this sand conditioning unit being broken away.

Fig. 9 is a vertical sectional view through the rotating sand conditioning unit, taken substantially on the plane of the line 9—9 of Fig. 8.

Fig. 10 is a detail sectional view through two of the sand conditioning trays for illustrating the details of the rotary mixing devices.

Fig. 11 is a fragmentary plan view taken directly above the plane of the lower conditioning tray, for illustrating the conveyor chamber into which this tray discharges, and Fig. 12 is a longitudinal sectional view through this conveyor chamber, taken approximately on the plane of the line 12—12 of Fig. 11.

Figure 1:
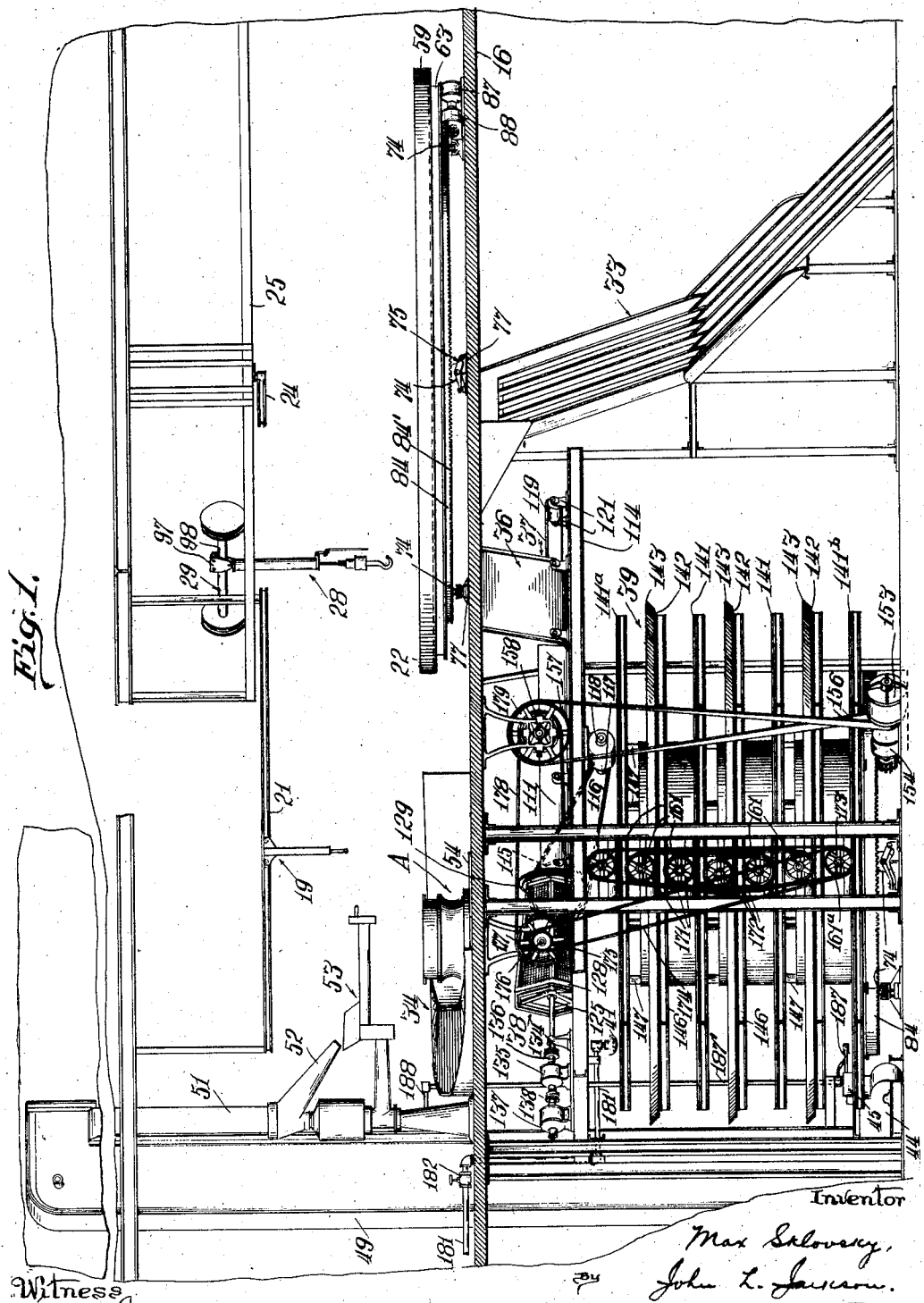
Figure 1 is a vertical sectional view through upper and lower floor levels of a foundry building, illustrating the relative positions of the several parts entering into the present methods and apparatus.

Figure 1 illustrates a typical installation of my improved apparatus. In this installation, the apparatus is located on two different floor levels, the upper floor line being indicated at 16. In this arrangement, the operations of forming the mold, pouring the metal therein, and opening and dumping the mold are all performed on the upper floor level, this being referred to as the "molding" floor. The remaining apparatus for screening, tempering, cutting and conditioning the sand is supported on the lower floor level, this being referred to as the "conditioning" floor for the purposes of the present description. The sand conditioning apparatus is preferably disposed directly below the aforesaid apparatus on the molding floor, substantially as illustrated. Such is the preferred manner of disposing the component parts of the system, inasmuch as by this arrangement the conveying of the sand through the different steps of its continuous cycle can be simply and easily performed. For example the gravitational feed of the sand from the upper floor level down to the sand conditioning apparatus on the lower floor is of advantage as it simplifies the handling and disposal of the sand dumped out of the flasks; and by such arrangement the excess sand which overflows the flask or is stricken off the flask in the mold forming operation is automatically returned to the system by gravitational feed. However, while this two level type of installation is preferable for the foregoing reasons, where space does not permit such type of installation, all of the apparatus can be disposed on the same or staggered levels without sacrificing the more important advantages of the invention.

To facilitate the understanding of the apparatus and the several steps involved I shall first describe the path and steps involved in the movement of each flask or mold, and thereafter shall describe the path or circuit of the molding sand, making brief reference to the functions of the several parts as they occur in each of these cycles. In a later part of this specification I shall describe the component parts in detail.

Figure 2:
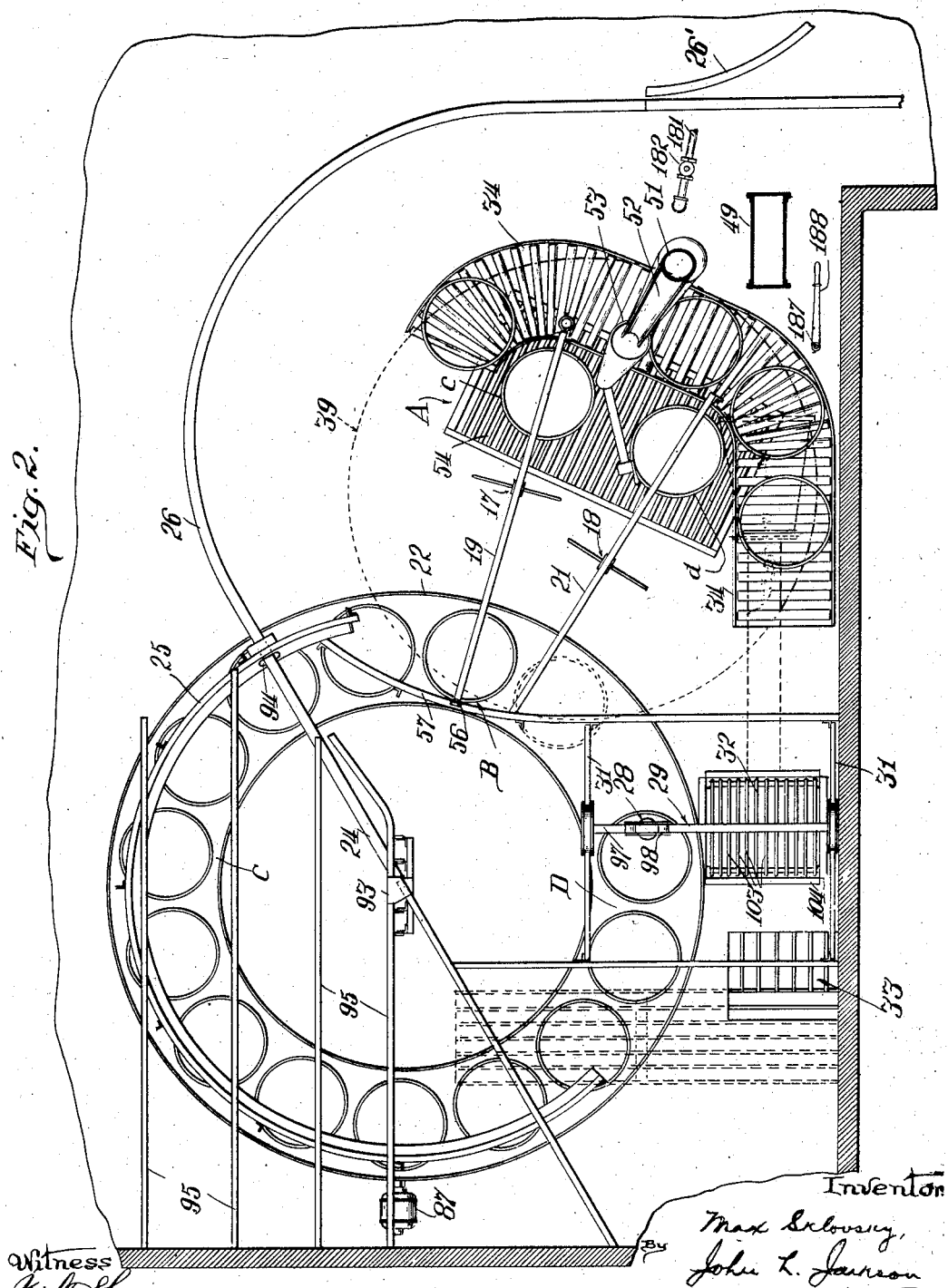
Fig. 2 is a plan view of the apparatus which is located on the molding floor.

The molds are first set or formed by a molding machine or machines located at a "mold forming zone" indicated at A in Fig. 2. The cope flask is indicated at $c$ and the drag flask is indicated at $d$, both of these flasks being filled in any suitable manner; in this instance a single stationary type of sand projector of the Beardsley-Piper type is shown for purposes of illustration.

After each flank is filled it is hooked or otherwise connected to an individual hoist 17—18, one being provided for each flask. One hoist has trolley mounting on the rail of a pivotally swinging jib crane 19. The other hoist 18 has trolley mounting on a rail 21 which may have swinging movement or which may be stationary. The outer ends of these overhead rails 19 and 21 extend over the edge of a rotating pouring table 22, and the cope and drag flasks are carried out on the hoists traveling on these rails and deposited on the edge of this pouring table. At such time the flasks are properly assembled, the swinging movement of the jib crane 19 permitting the cope flask to be moved laterally for placing the same upon the drag flask. The hoists 17—18 are then released and rolled back to the molding machine in readiness to receive the next pair of flasks.

The loading point where the flasks are assembled and loaded on the pouring table is indicated at B, and from this point the flasks are revolved around to a pouring zone C. Supported above the pouring table is a jib crane 24, the inner pivoted end of which is journaled for swinging motion about a vertical axis substantially coincident with the axis of the pouring table. The outer end of this jib crane tracks on a circular overhead track or rail 25. At one point of its angular movement, the jib crane 24 registers with an overhead track 26 which leads to the cupola or furnace from which is drawn the molten metal. The ladles carrying this molten metal are supported on trolleys adapted to roll on this overhead track system, each ladle having an individual hoist and control mechanism whereby it may be raised and lowered relative to its trolley, and tipped to pour its contents into the molds. After one of these ladles has been run on to the jib crane 24, the crane is swung to bring the ladle into pouring registry with the sprue holes of each successive mold. If the jib crane 24 is pivoted on a common supporting standard with the pouring table, the rotational motion of the pouring table 22 will tend to swing the jib crane 24 with it, thereby facilitating the pouring of the metal into each of the molds. The jib crane, can of course, be swung ahead or back of the motion of the pouring table for filling a multiplicity of molds. Generally, about five or six molds would be poured from one ladle.

The dumping zone, where the molds are lifted off the pouring table and dumped, is indicated at D in Figure 2. The rotation of the table 22 is comparatively slow so that by the time the molds have reached this dumping zone D the castings are sufficiently cool to be removed from the molds. At this point the mold is lifted from the table through the instrumentality of a suitable power hoist 28 supported on an overhead carriage 29 rolling along tracks 31, and is shaken to discharge its sand contents down through the grating 32. The casting is also shaken over the grating to remove sand adhering thereto, whereupon the casting is dumped into a chute 33 extending down through the floor. In lieu of this chute, any suitable conveying mechanism may be employed. After the sand has been dumped from both flasks, these flasks are placed on the forward end of a gravity conveyor 34 leading around to the rear of the mold forming zone A. This conveyor is of any suitable construction comprising side supporting members and rollers pivoted therebetween to define a sloping conveyor surface. The molder lifts these flasks from the conveyor, placing the cope and drag flasks on their proper supports, as previously described and again fills these flasks for a repetition of the cycle just described.

I shall now describe the circuit through which the sand passes from the point where it is dumped through the grating 32 to the point where it is discharged from the sand rammer into the flasks. Directly below the grating 32 is a hopper 36 through the lower part of which travels a conveying belt 37. This belt conveys the sand into the small end of a tapered polygonal screen 38 which is continuously rotated. Here the sand is tumbled and shaken up in its action of dropping down from side to side of this polygonal screen. As the sand is loosened it is sifted down through the screen upon the upper shelf or tray of a sand carrier 39. This device performs the several functions of cutting the sand, tempering the sand and maintaining a reserve accumulation of sand for meeting fluctuating demands. The unit comprises a series of vertically spaced circular trays or shelves which are rotated simultaneously, the sand being worked and conditioned on these shelves and being dropped progressively from one shelf to the next. The water for conditioning the sand is projected through a sprinkler head 41 located above the upper shelf and discharging water upon the sand as it is sifted down upon this upper shelf from the rotating screen 38. The sand contained on each shelf is cut and turned over by a plurality of rotating mixing devices indicated generally at 42 in Figure 9. These mixing devices also have the action of working the sand progressively inwardly or outwardly across the face of each shelf for discharging the sand down on to the next lower shelf. That is to say, in the case of one shelf or tray the discharge will be from the outer periphery thereof down on to the next tray, and for this shelf the mixing devices will work the sand outwardly toward its outer periphery. The next lower tray will be arranged to discharge the sand from its inner periphery, and in the case of this tray the mixing devices will progressively work the sand inwardly toward its inner periphery. This inward and outward moving and dropping of the sand from one tray to another continues down to the bottom tray where the sand is wiped or raked from the outer periphery thereof into a conveying chamber 44. Such discharge of the sand from the lower shelf or tray is effected by a rake 45 illustrated in Figures 11 and 12. This rake may be made adjustable and its positions may be controlled by the molder or his assistant at the mold forming zone A to regulate the volume of sand supplied to the sand ramming machine. Contained within the conveying chamber 44 is a rotary sand impeller 46 (Figures 11 and 12) which is located in the lower part of this chamber and which whips or throws the precipitated sand down into the lower boot 47 of a bucket conveyor 48. This conveyor carries the sand up through a conveyor casing 49 and projects it down into a vertical chute 51 (Figure 1), from whence it falls into the hopper or spout 52 of the sand ramming machine 53. This sand ramming machine preferably has an articulated arrangement of arms by which the sand projecting outlet of the machine can be swung to project the sand into any part of either of the flasks c or d.

The supports on which these two flasks are mounted for the operation of filling the same, are placed over a grating 54 formed in the floor 16, as best shown in Figure 2. The grating is directly above the upper tray or shelf of the sand conditioning unit 39 on the floor below, and consequently any excess sand which is spilled over or struck off the flasks can drop directly on to the top tray of this sand conditioning unit 39 and again pass through the conditioning cycle for redelivery to the sand ramming machine 53.

I shall now describe each of the parts in detail, taking up the same in the order in which they occur in the foregoing cycles of operation.

The hoists 17 and 18 and the jib cranes 19 and 21 are devices well known in the art and need not be described in any detail. The crane 19 has suitable pivotal mounting on an overhead support above the gravity conveyor 34. Its other end carries a roller 56 which tracks along an overhead supporting rail 57 curved substantially concentrically of the path of movement of this crane. Each hoist 17—18 has a trolley rolling along the horizontal rail of the crane, and the hoist may be either power or manually operated.

The pouring table is illustrated in cross section in Figure 3. It comprises a disk-like table top 58 of wood or metal. The outer edge of this table is faced with a ring 59 of angle bar cross section. The upper flange of this ring rises above the top of the table disk to confine a bed of sand 61 on the disk. The sand forms a suitable "matting" which may be struck off to form a level resting place for each mold. Such bed of sand also aids in cushioning the mold against any vibrations which might be set up in the table. If desired, an inner ring 62 may be secured to the top of the table to define an annular space between the outer and inner rings 59 and 62 for receiving the sand matting.

The disk is secured upon a structure of any suitable form, built up of channels or angles 63 joined together in a circular or polygonal frame. Secured to the under side of this frame structure, at the center thereof, is a spherical bearing socket 64 comprising upper and lower socket sections 65 and 66 joining on a horizontal diametrical plane passing through the socket. Engaging within this socket is a ball 67 supported on the upper end of a standard 68. The lower socket section is secured to the upper socket section, after the mounting of the ball therein, by screws 69 which hold the ball therein and which prevent any upward movement of the table relative to the ball and its standard 68. This standard is supported in a pedestal 71 consisting of two clamping halves which are bolted together over the standard. The standard has a key slot 68' therein for receiving a key carried by the pedestal 71, whereby the standard and ball are held against rotation. The pedestal 71 is suitably anchored to the floor 16.

A circular rail 73 is bolted to the under side of the frame 63 in inverted position, this rail rolling on a plurality of rollers 74 supported at circularly spaced points under this rail. As shown in Figure 4, each of these rollers is journaled between the side arms 75' of a forked yoke 75. One end of this yoke is pivoted at 76 to the stationary base plate 77, and the other end carries an arrangement of adjusting and clamping screws whereby the yoke may be raised or lowered to adjust the height of the roller 74. As shown in Figure 3, a central adjusting screw 78 threads down through the free end of the yoke and bears against an abutment surface at the end of the base plate. Two clamping screws 79—79 pass loosely through this end of the yoke and screw into holes in this abutment surface for clamping the yoke in any adjusted position. Antifriction bearings 81 of ball or roller type are interposed between the roller 74 and the journal member 82 carried between the side arms of the yoke. Removable cover plates 83 may be secured to one or both sides of each roller for confining the anti-friction bearings therein and for preventing the ingress of dirt or sand. These rollers carry all of the tipping pressures to which the table may be subjected because of uneven loading. Preferably, these rollers are adjusted so that they will also carry the entire weight of the table and its load, thus relieving the ball and socket center bearing of this duty, whereby this ball and socket bearing will only serve to center the table.

Secured to the under side of the table outside of the supporting rail 73 is a circular rack 84 of channel cross section, having its rack teeth 84' facing downwardly. Pairs of lugs 85 projecting laterally from this rack at spaced points receive bolts 86 by which the rack is secured to the frame structure 63 of the table. The table is preferably driven through an individual electric motor 87 disposed in close proximity to the table and preferably at a point removed from the loading and dumping zones B and D where it will not interfere with these operations (see Figure 2). This motor drives through a speed reducing unit 88, the armature shaft of the motor and the high speed shaft of the unit 88 being directly coupled through any suitable coupling 89 designed to take care of irregularities in alinement. The slow speed shaft of the gear reducing unit 88 carries a pinion 92 which meshes with the rack teeth 84'. In the installation which I have constructed for the casting of mower wheels the table is designed to carry approximately 14 large molds, each approximately forty-two inches in diameter, and the table is rotated at a speed of approximately one revolution every fifteen or twenty minutes.

The pouring crane 24 is suitably swiveled to an overhead support 93 for swinging movement substantially axially of the table 22. The swinging end of the crane is provided with one or more rollers 94 which roll on the inner flange of the curved track 25. This latter track is supported a considerable distance above the table by any suitable supporting frame work 95. In one position the pouring crane 24 alines with the overhead track 26 which leads out to the cupola as previously described. After filling at the cupola the ladles may be brought back to this track 26 on a spur track section 26' which can be switched over into registry with the main track section for continuing the travel of these refilled ladles up to the pouring table.

The workman performing the pouring operation can stand on the rotating table inside of the circle of molds. With a table constructed to carry the number of molds shown, approximately five of these molds will be filled from the ladle at one pouring operation, and hence this pouring zone will embrace approximately one-third of the travel of the molds on the table. The remaining path of travel up to the dumping zone D corresponds to a cooling zone in which the metal has opportunity to cool.

The hoisting device 28 for lifting the molds off the table at the dumping point D is of any suitable power operated type employing either compressed air or electricity for its operation. This hoist may be suspended from a trolley 97 rolling along the transverse rail 98 of the carriage 29. The movement of this carriage along the overhead rails 31—31 will enable the hoist 28 to be moved forwardly or outwardly in any direction from the table, whereby the hoist can be connected to a mold at any point in this dumping zone D. As before described, the mold is lifted from the table by this hoist and the flasks dumped to discharge the contained sand through the grating.

The gravity conveyor 34 is of any conventional construction, this conveyor being sloped down to and curved around in back of the molding machines for disposing the flasks in convenient position for the molder to lift and place upon the supporting standards for these flasks.

Referring to Figures 5 and 6, the grating 32 is supported in an opening 101 in the floor 16, this opening being marginally faced by an angle iron frame 102. The grating preferably comprises a series of bars 103 having their ends resting on the inwardly turned angle brackets 104 secured in the marginal frame 102. The bars 103 are maintained in spaced relation by passing tie rods 105 through alined holes in these bars, and interposing spacing sleeves 106 between the bars on these tie rods. The upper edge of the hopper 36 is riveted or bolted to the marginal frame 102 below the grate bars 103, this hopper tapering down toward its lower end in wedge shaped contour. Passing longitudinally through the bottom of this hopper is a conveyor belt 37. The ends of the hopper are left open adjacent the bottom thereof to permit the upper and lower flights of this conveyor belt to pass through the bottom of the hopper. Two or more rollers 107 are journaled on shafts 108 extending between the side walls of the hopper. These rollers sustain the upper stretch of the belt 37 and the weight of the sand supported thereon.

The direction of travel of the upper stretch of the belt is to the right towards the shaking screen 38, as viewed in Figure 5. Extending from the opening 109 at this end of the hopper is a trough 111 which serves to confine the sand carried on the belt and to prevent the loss of any sand spilling off the edges of the belt. This trough is extended up to the inlet end of the revolving screen 38, the belt 37 passing over a roller 112 at this point for projecting the sand into the screen. The shaft 113 on which this latter roller is mounted extends through openings in the side walls of the trough 111 and has bearing support in bearings carried by a framework 114 supported directly below the upper floor 16. One end of this shaft carries a large belt wheel 115 over which travels a belt 116 extending to a belt pulley 117 mounted on the armature shaft of an electric motor 118. As shown in Figure 1, the opposite end of the conveyor belt 37 which extends out through the rear end of the hopper 36 is passed around a roller 119 suitably journaled in supporting brackets 121 mounted on the frame 114.

The revolving screen 38 is constructed of a plurality of longitudinally extending bars 122 held in spaced relation to define the perimeter of the device by brackets 123 which are screwed to the inner sides of these bars and which are fastened at their inner ends to flanged hubs 124 mounted on the axial driving shaft 125. The bars 122 diverge outwardly toward the right hand end of the screen, as viewed in Figure 5, to give the screen a tapering pitch. The wire screening 126 encircles the outer sides of these bars and is held in place thereon by having its ends clamped between inner and outer bars or sections of strapping 127—128 bolted to the supporting bars 122. At the inlet end of the screen, the bars 122 are turned outwardly and are fastened to one side of a supporting ring 129. This ring 129 has a central flange which tracks in the grooved peripheries of two supporting rollers 131 carried in bearing brackets 132 secured to the frame work 114, as shown in Figure 7. The tension of the wire screening 126 around the spaced supporting bars 122 gives the screen a polygonal cross section, and by virtue of this and the tapered form of the screen the sand will sift through the screen or gradually work downwardly toward the large end thereof until the lumps too large to pass through the mesh of the screen are broken up sufficiently against a retaining ring 132 to permit the sand to sift down through the screen.

As shown in Figures 1 and 8, the driving shaft 125 is supported in a bearing 134 mounted on the framework 114, and beyond this bearing the shaft is connected to a speed reducing unit 135 through a coupling 136. An electric motor 137, mounted on the framework 114, is connected to this speed reducing unit 135 through a coupling 138. The framework 114, supporting the conveyor belt 37, the rotating screen 38, and the driving appurtenances for both of these elements, is preferably supported independently of the molding floor 16 so that any vibration set up in this framework 114 will not jar the molding floor.

The sand sifting down through the rotating screen 38 drops upon the upper surface of the sand carrying and conditioning device 39. As before described, this device comprises a tier of shelves or trays on which the sand is intimately mixed for securing the proper tempering and cutting thereof. In the construction shown, there are seven of such shelves or trays 141 and 142, although this number may be increased or decreased as desired. The upper tray 141$^a$ is continuous across its entire surface for receiving the sand sifting down through the screen 38, and the sand precipitated down through the grating 54. This top tray is arranged to discharge its sand from the outer edge thereof, and hence the second tray 142 is extended slightly beyond the outer edge of the upper tray to receive the sand dropping from the upper tray, the outer edge of the second tray having an upwardly turned lip 143 for preventing the sand from falling off the outer edge thereof. This second tray is annular in form, having an inner peripheral edge 144 from which the sand is dropped down on to the third tray 141. This and the succeeding trays alternate in the arrangement described of the first and second trays, whereby the sand is alternately dropped from the outer periphery of one tray and from the inner periphery of the next succeeding tray. The sand drops upon the inner portion of the bottom tray 141$^b$ and is discharged from the outer periphery thereof into the conveying chamber 44, which I shall hereinafter describe in detail.

Figure 8 illustrates one construction of framework for these trays. Each tray below the top tray 141$^a$ preferably comprises a series of segmental plates 145 which are riveted to radially and transversely extending angle bars 146 serving as a supporting structure for the tray. The several trays are held in spaced relation by vertically extending bars 147 arranged circularly in the form of a central cage. From each tray or shelf 141 an annular wall 148 extends upwardly to a point above the level of the next succeeding tray 142. This wall prevents the sand which drops from the inner edge 144 of the upper tray, and which accumulates on the lower tray 141, from moving inwardly beyond the range of the mixing devices 42. A deflecting skirt portion 149 is secured to the upper edge of each of these annular walls and extends downwardly below the frame bars of the tray for deflecting the falling sand outwardly on the lower tray 141.

The entire unit is supported and rotated in substantially the same manner described of the pouring table 22 of Figure 3. The unit is alined by a ball and socket joint interposed between the frame members of the lower shelf 141$^b$ and the lower floor level 151. This ball and socket joint comprises the upper socket portion 64, the ball 67, mounted on the standard 68 and the pedestal 71 for supporting this standard, all substantially the same as described of the ball and socket mounting for the pouring table 22. The weight of this sand conditioning unit and its load is carried on a rail 73 revolving over adjustable rollers 74, as previously described, and the unit is revolved through a depending rack 84 with which meshes a pinion 152. This pinion is driven from an electric motor 153 through a speed reducing unit 154, both mounted on the lower floor level 151. The shaft of the motor 153 carries a pulley 155 over which travels a belt 156 passing up to a large pulley 157 on an upper countershaft 158. From this countershaft a belt drive is transmitted to all of the mixing devices 42, as I shall presently describe.

As shown in Figures 9 and 10, one of the mixing units 42 is provided for each tray 141—142, the shaft of each mixing device extending radially in between upper and lower trays. These mixing devices are practically all identical and the description of one will suffice for all. Each mixer shaft 161 is journaled at its outer end in a bearing 162 supported between vertically extending frame members 163. The inner end of each shaft is supported in a bearing bracket 164 bolted to a channel member 165 extending transversely between the trays and supported at its outer ends in any suitable framework 166. Preferably, anti-friction bearings are employed at both the outer and inner bearings 162 and 164, as shown in Figure 10, and these anti-friction bearings must be adequately protected by cover plates 164' and the like for preventing the entrance of sand into these bearings. It will be observed from Figure 10 that the deflecting skirt members 149 serve to deflect the sand falling from each tray 142 outwardly beyond the bearings 164.

Mounted on each of these shafts is a plurality of mixing blades 167, each of which blades is supported between the halves of a split clamp 168 which clamps over the shaft 161. The blades are set at different angular positions about the shaft 161, and the blades are given such pitch that their net effect is to heap the sand over and simultaneously therewith to move the sand either inwardly or outwardly across the surface of the tray, depending upon which tray they are coacting with. That is to say, the action of the blades above each tray 141 will be to gradually work the sand outwardly toward the outer periphery of the tray and the action of the blades above each tray 142 will be to work the sand inwardly. While all of the blades on each shaft may be inclined to produce this action of working the sand progressively in one direction across the tray, I preferably incline one or two blades of each series at a reverse pitch so that their action will be to oppose the feeding action of the other blades. This opposing motion is, of course, overcome by the preponderating effect of the remaining blades in the series, but their action is to more intimately mix and agitate the sand.

As shown in Figure 1, the outer end of each shaft 161 carries a belt pulley 171, and these pulleys are all disposed in substantially vertical alinement. A multiplicity of belts 172 are trained over these pulleys, as shown in this figure, so that all pulleys are rotated simultaneously. The bottom shaft 161$^a$ also carries an outer pulley 173 over which passes a belt 174 leading up to a single pulley 175 on an upper countershaft 176. A large pulley 177 on this second countershaft is connected through a belt 178 with a pulley 179 on the first countershaft 158. Thus, through the drive transmitted to this countershaft from the motor 153, all of the mixing devices will be rotated simultaneously with the rotation of the several trays.

The sprinkler head 41 is suitably supported above the top tray 141$^a$ so that the sand is sprinkled immediately after its precipitation on the top tray. The pipe line 181 connecting to this sprinkler head leads up to a point adjacent the mold forming zone A where it is provided with a control valve 182 which the molder can manipulate to control the moisture in the sand. Thus, if, in the act of filling the molds, the molder finds that the sand is too wet or too dry, he can, without inconvenience, regulate the water supply to moisten the sand to the proper degree.

The conveyor chamber 44 has its inlet end disposed in immediate proximity to the edge of the lower tray 141$^b$, and a chute 183 extends from this chamber above the level of the lower tray so as to properly direct the sand deflected therefrom down into the chamber 44. It is opportune to remark at this point that in the case of the mixing device 42 for this lower tray 141$^b$, the one or two outermost blades are omitted as shown in Fig. 9 so that the sand will not be pushed off this tray but will accumulate in an outer ridge thereon in readiness to be deflected off by the rake 45. The rake 45 is pivoted at 184 to a bar 185 having vertical pivotal movement around a pivot 186 at its other end. The vertical swinging movement of this bar 185 permits the rake 45 to rise and fall, the rake normally resting under its own weight directly against the top of the disk 141$^b$. The rake is adapted to be swung to different angular positions for controlling the rate of discharge into the conveyor chamber 44 through a control rod 187 which is pivotally connected to the rake and which is operative to swing the same around its pivot 184 to control the radial depth of sand deflected off the lower tray. The rod 187 has connection through actuating linkage 187' with a control member 188 disposed in close proximity to the molder at the mold forming zone A. If the rate of feed to the molding machine is too fast or too slow, the molder, by simply manipulating the control member 188, can properly regulate the rate of feed for the most efficient operation of the mold forming apparatus.

The sand impeller 46 is disposed adjacent the bottom of the conveyor chamber 44 and comprises a multiple arm spider 189 mounted on the shaft 191. Blades 192 are detachably bolted to the arms of the spider, whereby these blades may be renewed in the event of wear. The shaft 191 extends through openings in the side walls of the chamber 44 and is journaled in bearings 193 suitably supported outside of this chamber. This shaft is connected through a coupling 194 directly to the armature shaft of an electric motor 195, the sand impeller being thereby driven at a relatively high speed.

The sand is pitched by this sand impeller down into the lower boot 47 of the bucket conveyor 48, as before described. This bucket conveyor is of any suitable design, comprising an endless belt or chain 196 carrying spaced buckets 197. The speed of this bucket conveyor is such that the sand will be pitched from the upper end of the conveyor casing 49 into the vertical chute 51 without dropping any appreciable quantity of sand down into the boot 47.

The sand ramming or sand slinging machine 53 is of the type known as the Beardsley-Piper machine, and the supply of sand to this machine and its operation need not be described as this type of machine is well known in the art.

As previously described, the mold flasks are filled over a grating 54 through which the spilled and stricken off sand can fall. The sand carrier and conditioner 39 is disposed directly below this mold forming zone A so that this sand falling through the grating 54 will drop directly upon the top tray of the unit 39, from whence it will again be conveyed through the ensuing portion of the cycle back to the sand ramming machine 53.

The power drive of the bucket conveyor 48 may be from a separate electric motor and a cooperating speed reducing unit, or this bucket conveyor may be mechanically connected so as to be driven from the impeller shaft 191.

The electric motor for operating the sand ramming machine is generally controlled through a switch embodied in the handle of the sand projecting arm, through which handle the sand projecting nozzle is swung to different parts of the mold. I contemplate placing the circuit of the electric motor 195 (and of the electric motor for driving the bucket conveyor, where such separate drive is employed) under the control of this same switch, so that the act of interrupting the operation of the sand ramming machine, temporarily, will also interrupt the feed of sand to the ramming machine.

In conclusion, it will be apparent that the sand will be conducted through all of the steps of its conditioning cycle in a comparatively uniform thin stratum or stream and is subjected to uniform treatment, so that all parts of the sand will be directly acted upon, quickly cooled, and intimately mixed in the conditioning thereof. For example, the water added to the sand is brought into immediate contact with practically all portions of the sand so that it is not necessary to delay subsequent use of the sand over a considerable time period in order to allow the water to permeate uniformly through the sand. Also, by retaining the sand in a thin stratum or in small masses there is no opportunity for the sand to pack. The dissipation of the heat absorbed by the sand from the molten metal during its prior use is a part of the conditioning cycle, and it is to be noted that the repeated aeration of the sand that occurs during its intimate mixing, and while it is in a comparatively thin stratum or stream, quickly dissipates the heat, and avoids the delay in the reuse of the sand which has heretofore been entailed due to the cooling period, after mixing, required by other processes of sand conditioning. Whenever it is necessary to add more clay to the sand for additional binder, this can be introduced on the top tray of the conditioning unit where it will first be moistened and thereafter thoroughly mixed with the sand in the subsequent cutting and mixing steps performed by the multiple mixing devices 42.

If a magnetic separator is employed for removing particles of the casting metal from the sand, this separator, preferably an electromagnet, may be located at any preferred point in the cycle where the sand stratum is comparatively thin, such as above the upper stretch of the conveyor belt 37.

In the appended claims wherein I refer to the steps and apparatus for treating the sand, I have used the term "conditioning" in its broadest meaning as denoting either the adding of water, or the adding of clay to the sand, or the mixing of the sand, or the cooling of the sand, or the screening thereof, or all of these steps taken collectively.

While I have shown certain preferred methods and apparatus for carrying out my invention, it will be understood that such methods and apparatus are merely exemplary and can be varied widely without departing from the broad scope of the invention.

What I claim as my invention and desire to secure by Letters Patent, is—

1. In apparatus for conditioning molding sand, the combination of a series of superposed imperforate trays all rotating together, and means for mixing the sand on said trays and for causing it to fall successively between said trays.

2. In apparatus for conditioning molding sand, the combination of a plurality of superposed trays all rotating together, and means for mixing the sand on said trays and for causing it to fall successively downwardly through the series of trays.

3. In apparatus for conditioning molding sand, the combination of a plurality of superposed trays all rigidly connected together, means for mixing the sand on said trays and for causing it to move progressively downward through the series of trays, and means for causing relative movement between said trays and said first named means about a substantially vertical axis.

4. In apparatus for conditioning molding sand, the combination of a series of superposed trays all rotating together, and means engaging the sand on said trays for moving the sand radially of said trays for dropping from tray to tray.

5. In apparatus for conditioning molding sand, the combination of a series of superposed trays all rotating together, and mixing apparatus for mixing the sand on said trays and for causing the sand to move inwardly and outwardly of said trays for dropping from one tray to the next.

6. In apparatus for conditioning molding sand, the combination of a plurality of superposed rotating trays, and mixing devices engaging with the sand on each of said trays, said mixing devices causing said sand to move inwardly and outwardly of said trays for dropping from the inner and outer peripheries thereof.

7. In sand conditioning apparatus, the combination of a revolving supporting member for conveying a bed of sand, a rotating mixing member extending transversely across the path of movement of said supporting member for mixing the sand, and means for causing relative movement between said members.

8. In sand conditioning apparatus, the combination of a rotating supporting member for supporting a bed of sand, a mixing member for mixing the sand rotating about an axis at an angle to the axis of said supporting member, and means for causing relative transational motion between the bed of sand and said mixing member.

9. In sand conditioning apparatus, the combination of a supporting surface supporting a bed of sand, a mixing member rotating about an axis substantially parallel to said supporting surface for mixing the sand, and means for causing relative rotational motion between the bed of sand and the axis of mixing member.

10. In sand conditioning apparatus, the combination of a plurality of superposed supporting members mounted for rotation about a substantially vertical axis and means movable relatively to all of said supporting members for causing the sand to fall progressively from one of said members to the next in the conditioning thereof.

11. In sand conditioning apparatus, the combination of superposed rotating carriers rotating about one axis, and rotating mixing devices rotating about another axis for mixing the sand while moving on said carriers.

12. In apparatus for conditioning and handling molding sand, the combination of a moving supporting member for supporting a bed of sand, a mixing member for mixing the sand and having operating movement about an axis extending substantially parallel with said supporting member, means for causing relative movement between said members, a chamber, means for deflecting the sand from said supporting member into said chamber, a conveyor for conveying the sand to a point of use, and impelling means for projecting the sand from said chamber to said conveyor.

13. In apparatus for conditioning and handling molding sand, the combination of a moving sand carrying surface, means for mixing the sand thereon, and adjustable means for discharging variable quantities of sand from said carrying surface after the completion of the mixing operation thereon.

14. In apparatus for conditioning and handling molding sand, the combination of a horizontally rotating sand carrying surface, means for mixing the sand thereon, deflecting means for discharging the sand from said surface, and remote operating means located adjacent the point of use of the sand for adjusting said deflecting means.

15. Sand conditioning apparatus of the class described comprising a series of superposed trays adapted to carry the sand in its conditioning operations, a frame structure supporting said trays, a central pivot for said frame structure, a circular rail on said frame structure, a plurality of rollers on which said rail tracks, a circular rack on said frame structure, and a gear meshing with said rack for rotating with said operating.

16. A sand conditioning unit of the class described, comprising a series of superposed trays adapted to carry the sand during the performance of conditioning operations thereon, a frame structure supporting said trays, a ball and socket central pivot for said frame structure, a circular rail on said frame structure, a plurality of rollers on which said rail tracks, adjustable supporting brackets for raising and lowering said rollers, a circular rack on said frame structure, and a gear meshing with said rack for rotating said unit.

17. A sand conditioning machine comprising a plurality of superposed trays adapted to support the sand, a frame structure carrying said trays, a central pivot around which said frame structure revolves, and supporting means for said frame structure comprising a circular rail and a plurality of rollers engaging with said rail, said supporting means carrying substantially the entire weight of said unit.

18. The method of handling and conditioning sand for foundry use which comprises moving the sand with a substantially continuous motion through a sand conditioning cycle extending from the point of dumping from the molds to the point of subsequent use in the formation of new molds, screening the sand while in continuous motion in said cycle, and tempering and cutting the sand by distributing the same in a series of beds, mixing the sand in said beds, and dropping the sand progressively from one bed to another all while the sand is in continuous motion in said cycle.

19. The method of handling and conditioning sand for foundry use which comprises moving the sand with a continuous motion through a conditioning cycle extending from the point of dumping from the molds back to the point of subsequent use in the formation of new molds, screening the sand while in continuous motion in said cycle, and passing the sand downwardly over a series of superposed rotating conditioning surfaces for tempering, cutting and cooling the sand in its continuous motion through said conditioning cycle.

20. In sand conditioning apparatus, the combination of a series of superposed rotating trays adapted to support beds of sand thereon, and mixing means engaging the sand on said trays for moving the same to the inner and outer peripheries of the trays, the inner and outer peripheries of said trays extending in alternating overlapping relation whereby the sand drops from the inner periphery of one tray to the next lower tray and from the outer periphery of said lower tray to the next succeeding tray.

21. In sand conditioning apparatus, the combination of a series of superposed rotating trays adapted to support beds of sand thereon, rotating shafts extending across the upper surfaces of said trays, and blades on said shafts operative to mix the sand on said trays and to move the same to the peripheries of the trays for dropping to the next lower tray.

22. In apparatus for conditioning molding sand, the combination of a series of superposed rotating trays, means for feeding the sand thereto, mixing means cooperating with said trays for moving the sand transversely across the trays for dropping from tray to tray, means for conveying the conditioned sand from said trays to a mold forming zone, spray means for supplying water to the sand on said trays, and control means actuable from said mold forming zone for controlling said spray means.

23. In apparatus for conditioning molding sand, the combination of a hopper adapted to receive the sand after dumping from the molds, a conveyor belt traveling through the lower portion of said hopper, a rotating screen into which the sand is discharged from said conveyor belt, a series of superposed rotating trays adapted to receive the sand from said rotating screen, means for mixing the sand on said trays and for causing the same to fall from tray to tray, and means for conveying the sand from said series of trays to a mold forming zone.

24. In a sand conditioning device of the class described, the combination of central supporting means, a plurality of superposed trays all carried on said central supporting means, bearing means for said device, means for rotating all of said trays, and means for conditioning the sand carried on said trays.

25. A sand conditioning device of the class described comprising central supporting means, a plurality of superposed trays all secured to said central supporting means for simultaneous rotation, bearing means for said device, means for rotating said trays, and means for conditioning the sand carried on said trays and for causing the sand to fall progressively from one tray to the next.

26. In apparatus for conditioning molding sand, the combination of means for supplying water to the sand, a series of imperforate superposed trays all rotating together, and means for mixing the moistened sand on said trays and for causing it to fall successively between said trays.

27. In apparatus for conditioning molding sand, the combination of means for introducing water into the molding sand, a series of superposed rotating trays, and mixing apparatus moving relatively to all of said trays for mixing the moistened sand on said trays, and for causing the sand to move inwardly and outwardly on said trays for dropping from one tray to the next.

28. In sand conditioning apparatus, the combination of superposed trays rotating about a substantially vertical axis, and rotary mixing devices adapted for rotation about another axis and operating to mix the sand on said trays.

29. In sand conditioning apparatus, the combination of a plurality of superposed trays rotating about a substantially vertical axis, and rotary mixing devices adapted for rotation about other axes at an angle to said substantially vertical axis, and operating to mix the sand on said trays and to move the sand transversely across the trays for falling from one tray to the next.

30. In sand conditioning apparatus, the combination of a horizontally rotating supporting member for conveying a bed of sand, a shaft extending across the top of said bed of sand at an angle to the path of movement of said supporting member, and a plurality of rotary mixing devices mounted on said shaft for mixing the sand.

31. In sand conditioning apparatus, the combination of a plurality of superposed rotating trays each adapted to support a quantity of sand thereon, a plurality of shafts each disposed above one of said trays and extending at an angle to the path of movement of the sand supported thereon, and a plurality of rotary mixing devices mounted on said shafts for mixing the sand on said trays.

32. In apparatus for conditioning and handling molding sand, the combination of a plurality of superposed trays for supporting the sand, a plurality of mixing members rotating relatively to all of said trays for mixing the sand on said trays, means for causing relative movement between said trays and said mixing members, a conveyor for conveying the sand to a point of use, and means for deflecting the sand from the lowermost tray to said conveyor.

33. In apparatus for conditioning and and handling molding sand, the combination of a plurality of superposed rotating trays for supporting the sand in different beds, a mixing member for mixing the sand, means for causing relative movement between said mixing member and all of said trays, means for deflecting the sand from the lowermost tray into said chamber, a conveyor for conveying the sand to a point of use, and impelling means for projecting the sand from said chamber to said conveyor.

34. In apparatus for handling and conditioning molding sand wherein the sand is moved substantially continuously in a conditioning cycle extending from the point of dumping from the molds back to the point of subsequent use in the formation of new molds, the combination of conveying means for conveying the sand from said dumping point, screening means receiving the sand from said conveying means, a plurality of conditioning surfaces receiving the sand from said screening means and supporting the sand in distributed beds, means for mixing the sand in said beds and for causing it to fall progressively from one bed to another, and conveying means for conveying the sand from said beds back to the point of subsequent use in the formation of new molds.

35. The herein described method which comprises taking the sand after dumping from the molds, transferring it to the uppermost one of a plurality of superposed rotating surfaces, on which surfaces the sand is distributed in relatively shallow beds, dropping the sand from one surface down to the next for aerating the sand, engaging the beds of sand on said rotating surfaces with mixing devices to turn the sand over and to intimately mix it, all while in continuous motion on said surfaces, and returning the conditioned sand to the mold forming zone for use in making up new molds.

MAX SKLOVSKY.